(12) United States Patent
Jin et al.

(10) Patent No.: US 6,370,310 B1
(45) Date of Patent: Apr. 9, 2002

(54) FIBER OPTIC GRATING TEMPERATURE COMPENSATION DEVICE AND METHOD

(75) Inventors: Wenlin Jin, Pierrefonds; Peter Kung, Pointe Claire, both of (CA)

(73) Assignee: Bragg Photonics, Inc., Dorval (CA)

( * ) Notice: Subject to any disclaimer, the term of this patent is extended or adjusted under 35 U.S.C. 154(b) by 0 days.

(21) Appl. No.: 09/471,238

(22) Filed: Dec. 23, 1999

(30) Foreign Application Priority Data

Dec. 23, 1998 (GB) .............................................. 9828584

(51) Int. Cl.$^7$ ................................................ G02B 6/00
(52) U.S. Cl. ........................... 385/136; 385/31; 385/37; 385/137
(58) Field of Search ............................ 385/31, 37, 137, 385/136

(56) References Cited

U.S. PATENT DOCUMENTS

| | | | |
|---|---|---|---|
| 5,042,898 A | 8/1991 | Morey et al. ................. | 385/37 |
| 5,469,520 A | 11/1995 | Morey et al. ............... | 385/137 |
| 5,694,503 A | 12/1997 | Fleming et al. .............. | 385/37 |
| 5,757,540 A | 5/1998 | Judkins et al. ................ | 385/37 |
| 5,774,619 A | 6/1998 | Bruesselbach ............... | 385/37 |
| 5,809,188 A | 9/1998 | Tseng et al. .................. | 385/37 |
| 5,812,711 A | 9/1998 | Glass et al. ................. | 359/341 |
| 5,841,920 A | 11/1998 | Lemaire et al. .............. | 385/37 |
| 5,920,663 A * | 7/1999 | Dragone ...................... | 385/15 |
| 6,181,851 B1 * | 1/2001 | Pan et al. ..................... | 385/37 |
| 6,243,527 B1 * | 6/2001 | Dawson-Elli ............... | 385/136 |

OTHER PUBLICATIONS

G.W. Yoffee et al., "Passive Temperature–Compensating Package for Optical Fiber Gratings", Applied Optics, Oct., 1995, vol. 34, No. 30 pp. 6859–6861.

J.J. Pan et al., "Zero–Wavelength Shift Temperature Stabilized Multi–FBG Package", pp. 65–72, vol. II, Proceedings of National Fiber Optic Engineers Conference, Orlando, Florida, 1998.

J.J. Pan P. Ma et al., "Ultra–Stable Temperature Compensated Package of Steep Skirt Fiber Bragg Grating for Dense WDM", p. 357, vol. 1. Proceedings of National Fiber Optic Engineers Conference, San Diego, 1997.

* cited by examiner

Primary Examiner—Ellen E. Kim
(74) Attorney, Agent, or Firm—Shlesinger, Arkwright & Garvey LLP

(57) ABSTRACT

A device for compensating for changes of a center wavelength of a fiber optic grating due to temperature variations comprising a holder including a first and second connector for securing a fiber optic grating, the first connector is fixed, the second connector is movable to increase or decrease a strain in the grating, a source of force applied to the second connector, and the source of force varies with changes in temperature, such that with and increase in temperature the second connector moves toward the first connector to decrease the strain in the fiber optic grating; and, a method for compensating for changes of a center wavelength of a fiber optic grating due to temperature variations.

24 Claims, 3 Drawing Sheets

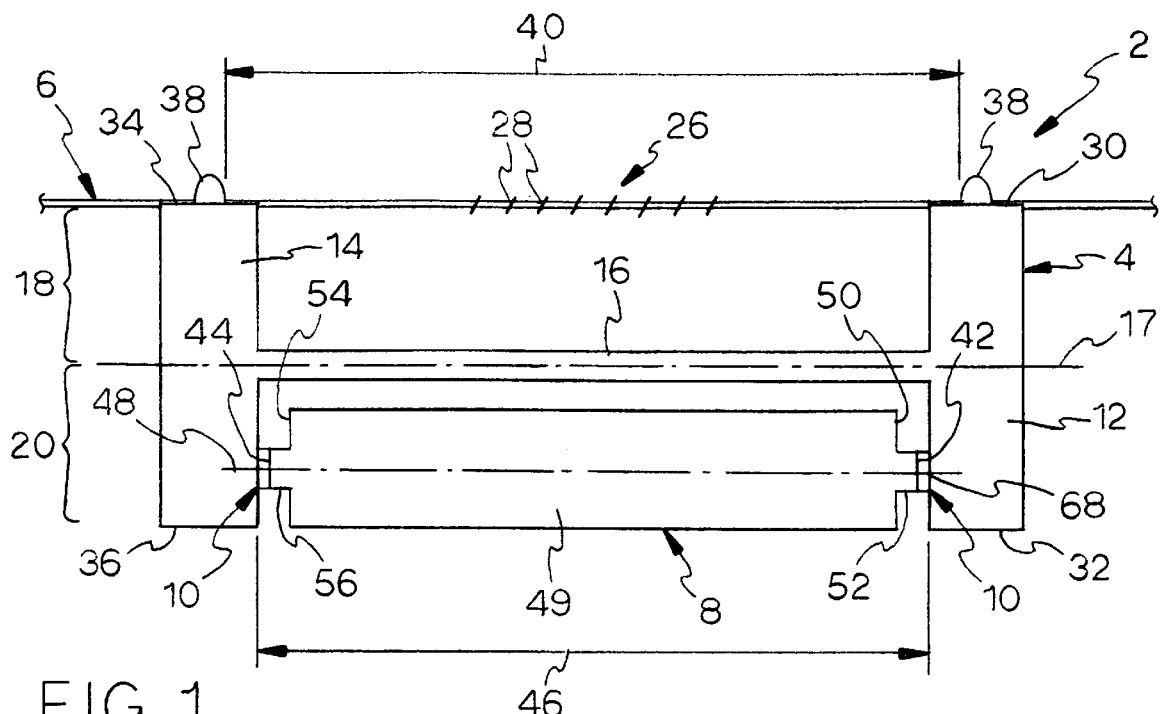
FIG.1
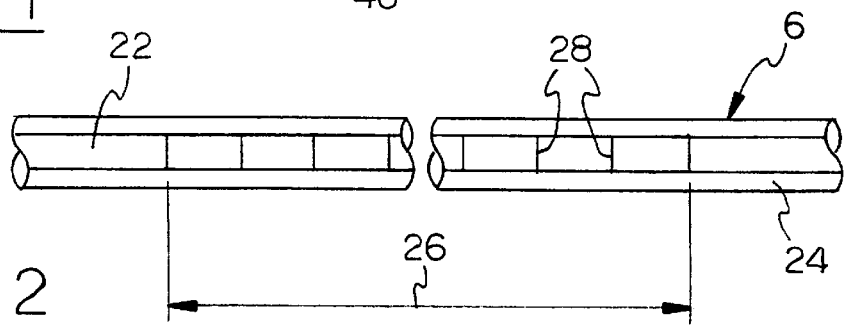
FIG.2
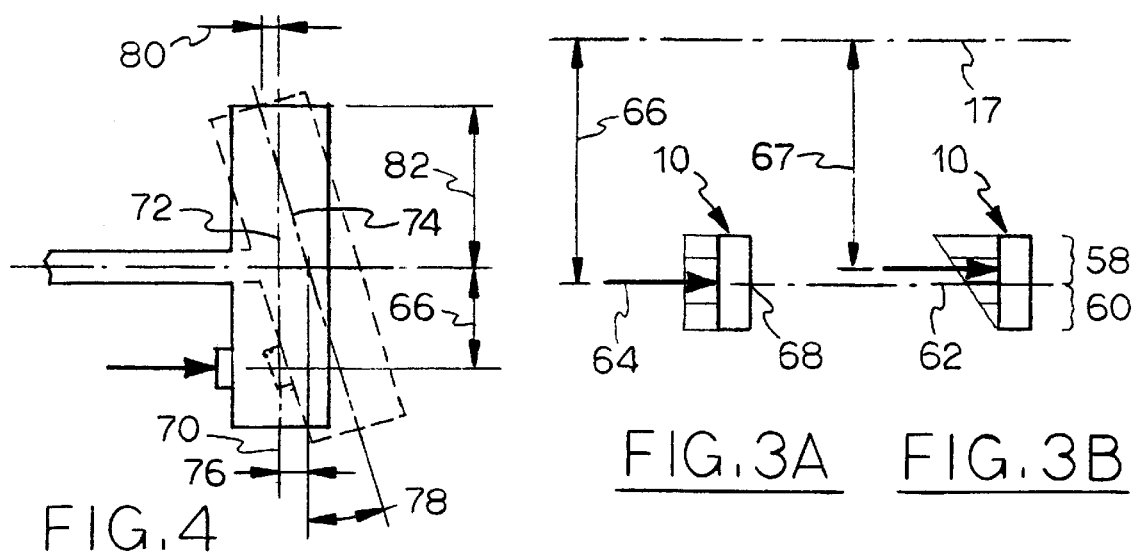
FIG.3A  FIG.3B
FIG.4

FIBER OPTIC GRATING TEMPERATURE COMPENSATION DEVICE AND METHOD

FIELD OF THE INVENTION

This application claims priority from the United Kingdom patent Application No. 9828584.4, filed on Dec. 23, 1998, which is hereby incorporated by reference.

This invention relates to optical filters in general, and more particularly to fiber optic grating temperature compensation devices and methods for compensating for changes in center wavelengths of light passing through fiber optic gratings due to temperature changes.

BACKGROUND OF THE INVENTION

Optical fibers are important components in modern communication systems. Optical fibers provide for the transmission of optical signals, which are capable of containing massive amounts of information. There has been a need to reflect particular light wavelengths for various applications. Optical filters have been developed for that purpose. A well known, and commonly employed filter is a Bragg filter or Bragg grating.

Optical fiber gratings are often subject to varying environmental conditions, including changes in temperature. The center wavelength of optical fiber gratings is sensitive to changes in environmental temperature.

For the purpose of optical communication systems, the center wavelength of optical fiber gratings should be stable. As optical channel space becomes narrower for higher capacity communication systems, the requirements have become increasingly stringent for controlling and stabilizing the center wavelength of gratings.

The magnitude of the center wavelength variation due to the nonlinearity within common operation temperature range of gratings, −20 to 70 degrees Celsius, can be as high as 50 pm, which is nearly the limit of the allowed variation of the center wavelength of gratings for 100 GHz dense wavelength division multiplexing (DWDM) systems.

U.S. Pat. No. 5,042,898, issued to W. W. Morey and W. L. Glomb on Aug. 27, 1991, proposed the principle of compensating the temperature related shifting of the center wavelength of a fiber optic grating by generating strain in a grating to change the center wavelength in an opposite direction of the shifting. The Morey and Glomb device as well as other conventional existing athermal temperature compensation designs for gratings are all based on the principle that the wavelength variance has a substantially linear relationship with the changes in strain or temperature subjected to the grating. However, this relationship actually has linear and nonlinear portions. These previous conventional devices compensate only the linear portion of the temperature sensitivity of the gratings.

It is further desirable to post-modigy or post tune the amount a compensation device actually compensates for center wavelength variances due to temperature changes. It is also desirable to post-modify or post tune the center wavelength of the grating.

Therefore, a new device and method is required for providing nonlinear compensation of the temperature sensitivity of the center wavelength of fiber optic gratings and for avoiding the disadvantages of the prior art.

OBJECTS AND SUMMARY OF THE INVENTION

It is an object of the present invention to realize nonlinear compensation of the temperature sensitivity of the center wavelength of fiber optic gratings.

A further object of the present invention is to provide a device and a method for post tuning of the compensation of the temperature sensitivity of the center wavelength of fiber optic gratings.

Yet, another object of this invention is to provide a device and a method for post tuning of the center wavelength of fiber optic gratings.

Still, a further object of this invention is to provide a device and a method for nonlinear compensation of the temperature sensitivity of the center wavelength of fiber Bragg gratings, comprising a bi-material structure that generates nonlinear displacement from linear deformation of its components, and a fiber grating mounted on the bi-material structure where nonlinear displacement is generated.

A further object of this invention is to provide a device and a method for post-tuning of the compensation of the temperature sensitivity of the center wavelength of fiber Bragg gratings, including modifying the thermal property of one of the components of a bi-material structure.

Yet, a further object of the present invention is to provide a device and a method for post-tuning of a center wavelength of fiber Bragg gratings, including modifying the dimension of one of the components of the a bi-material structure.

In summary, the present invention discloses a novel fiber optic temperature compensating device comprising a holder, a compensator and a layer. The holder has a first thermal expansion coefficient, a first leg, a second leg and a bar member. The bar member connects the first leg to the second leg and the bar member defines a first portion and a second portion of the device. The holder is operably configured for holding an optical fiber grating between the first leg and the leg in the first portion, whereby the optical fiber grating is operably adapted for passage of light therethrough and for reflecting the light within a range about a center wavelength that varies with changes in ambient temperature of the device and with changes in an axial strain subjected to the optical fiber grating. The compensator has a second thermal expansion coefficient and an end. The compensator is disposed between the first leg and the second leg in the second portion. The second thermal expansion coefficient is greater than the first thermal expansion coefficient so that an increase in ambient temperature of the device causes the compensator to expand at a greater rate than the holder and the compensator applies to the holder a force, located at an applied distance from the bar member, whereby the axial strain of the optical fiber grating is reduced to vary the center wavelength of the grating, providing a compensation for variations in the center wavelength introduced by the increase in ambient temperature. The layer is disposed between the end of the compensator and the first leg of the holder. The layer is flexible so that an increase in ambient temperature will vary the applied distance of the force, making the compensation a nonlinear function of the temperature, whereby an increase in temperature imparts a decrease in the applied distance.

The present invention also discloses a novel device for compensating for changes in a center wavelength of a fiber optic grating due to temperature variations, comprising a holder, a compensator and a layer. The holder has a first leg, a second leg and a bar member connecting the first and second legs. The fiber optic grating is attached to the first and second legs. The compensator is attached to the first and second legs of the holder. The layer is disposed between the compensator and the first leg of the holder. The bar member is disposed between the compensator and the fiber optic grating. The holder and the compensator have respective thermal expansion coefficients. The thermal expansion coefficient of the compensator is greater in value than the thermal expansion coefficient of the holder.

The present invention also discloses a novel device comprising a holder including a first and second connector for securing a fiber optic grating, the first connector is fixed, the second connector is movable to increase or decrease a strain in the grating; and a source of force applied to said second connector, the said source of force varies with changes in temperature, such that with and increase in temperature the second connector moves toward the first connector thereby decreasing the strain in the fiber optic grating.

The present invention also discloses a novel method of compensating for changes of a center wavelength of a fiber optic grating due to temperature variations comprising the steps of: providing a holder having a first thermal expansion coefficient, a first leg, a second leg and a bar member, the bar member connecting the first leg and the second leg and the bar member defining a first portion and a second portion of the device; applying a pre-load axial strain to the fiber optic grating; attaching the fiber optic grating with the pre-load axial strain to the first leg and the second leg in the first portion, whereby the optical fiber grating is operably adapted for passage of light therethrough and for reflecting the light within a range about a center wavelength that varies with changes in temperature of the device and with changes in an axial strain subjected to the optical fiber grating; providing a compensator having an end and a second thermal expansion coefficient that is greater in value than the first thermal expansion coefficient; disposing the compensator between the first leg and the second leg in the second portion, whereby an increase in temperature of the device causes the compensator to expand at a greater rate than the holder and the compensator t, applies to the holder a force, located at an applied distance from the bar member, whereby the axial strain of the optical fiber grating is reduced to vary the central wavelength of the grating, providing a compensation for variations in the central wavelength introduced by the increase in temperature; providing a layer that is flexible; and, disposing the layer between the end of the compensator and the first leg of the holder, so that an increase in temperature will vary the applied distance of the force making the compensation a nonlinear function of the temperature, whereby an increase in temperature imparts a decrease in the applied distance.

These and other objects of the invention will be apparent from the following detailed description.

DESCRIPTIONS OF THE DRAWINGS

FIG. 1 is a schematic view of an optical fiber grating temperature compensation device, made in accordance with the present invention;

FIG. 2 is an axial sectional view of an optical fiber with an embedded grating;

FIG. 3A is a schematic view of a layer of the present invention with a force diagram;

FIG. 3B is a schematic view of the layer shown with the force diagrams in FIG. 3A, after an increase in temperature;

FIG. 4 is a schematic view of a portion of a holder, displaying exaggerated deformations thereof in phantom lines;

DETAILED DESCRIPTION OF THE INVENTION

Figure 5:
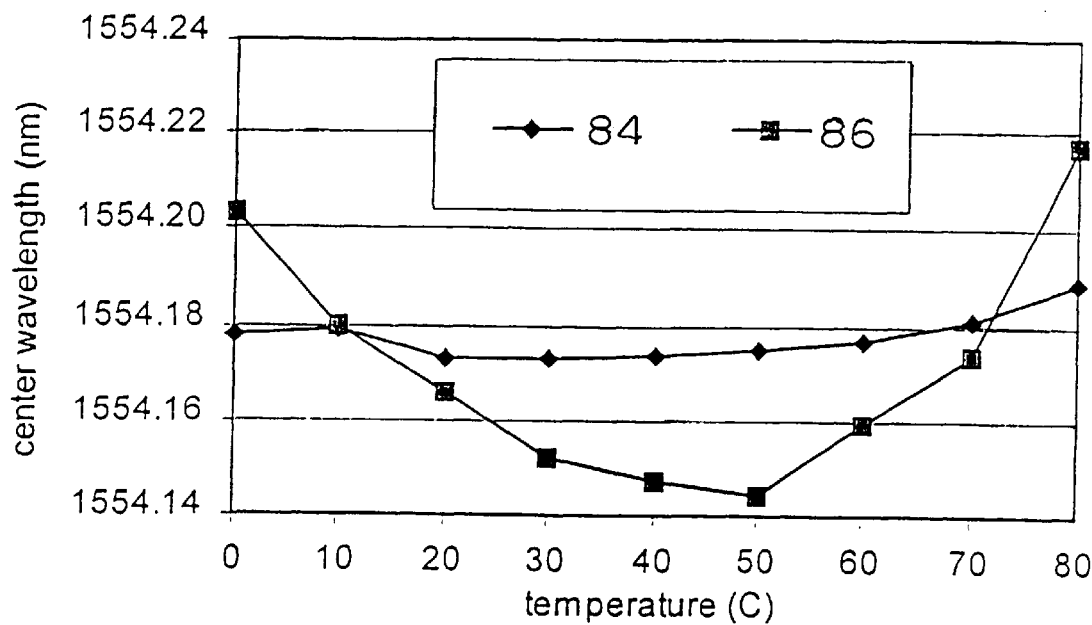
FIG. 5 shows a temperature/center-wavelength curve of a grating with the nonlinear compensation device of the present invention, and a curve of a grating with a conventional compensation.

Referring to FIG. 1, an optical fiber grating temperature compensating device 2 made in accordance with the present invention is shown. Device 2 includes a holder 4 for holding, an optical fiber 6, a compensator 8 and a layer 10.

Holder 4 includes a first leg 12, a second leg 14 and a bar member 16. Bar member 16 connects first leg 12 to second leg 14. Holder 4 also includes a first portion 18 and a second portion 20. First and second portions 18 and 20 are divided by bar member 16. A reference line or axis 17 is disposed along the length of holder 4. Reference line 17 extends through member 16 along its length.

Holder 4 is made of a material that has a thermal expansion, or extension, coefficient, $\alpha_h$. Holder 4 is generally H-shaped. First leg 12 has a first end 30 disposed within first portion 18, and a second end 32 disposed within second portion 20. Second leg 14 has a first end 34 disposed within first portion 18, and a second end 36 disposed within second portion 20.

As shown in FIG. 2, optical fiber 6, comprises a fiber core 22 and a fiber cladding 24. Fiber cladding 24 surrounds fiber core 22. Embedded in a region of fiber core 22 is a grating 26, comprising a plurality of gratings elements 28. Grating 26 may be of any desired or suitable type of optical filter, such as a Bragg filter or grating disclosed in U.S. Pat. No. 4,725,110, a long period grating or a blaze grating.

Light travels through optical fiber 6 via fiber core 22. Grating 28 is configured for reflecting the light within a range about a central wavelength. The center wavelength varies with changes in temperature and the center wavelength also varies when grating 26 is subjected to an axial strain.

Referring again to FIG. 1, optical fiber 6 is attached to As first leg 12 and second leg 14. Optical fiber 6 is attached to first and second legs 12 and 14 within first portion 18 of holder 4. Optical fiber 6 is disposed adjacent to first end 30 of first leg 12. Optical fiber 6 is disposed adjacent to first end 34 of second leg 14. Optical fiber 6 is attached to first end 30 of first leg 12. Optical fiber 6 is attached to first end 34 of second leg 14.

Optical fiber 6 is attached to holder 4 with connecting members 38. Connecting members 38 are solid adhesive drops. Connecting members 38 may also be of a mechanical type, such as clamps or the like, or they may be an adhesive, solder, or the like. Choosing which type of connecting members 38 to use will be based on the balancing of high performance, with a higher cost to manufacture, versus lower performance, with a lower cost to manufacture. Performance being the ability to hold the fiber optic to holder 4. Nevertheless, any of the aforementioned connectors, or their equivalents recognized in the art, will suffice for the present invention.

Connecting members 38 define a length 40, ($l_h$), of optical fiber 6 that is disposed between first end 30 of first leg 12, and first end 34 of second leg 14.

Optical fiber 6 is initially attached to holder 4 so that optical fiber 6 is in tension, thereby causing an axial strain in optical fiber 6.

Compensator 8 has a thermal expansion, or extension, coefficient, $\alpha_c$. Compensator 8 has a first end 42. Compensator 8 has a second end 44. Compensator 8 has a length 46, ($l_c$). Compensator 8 has an axis 48 extending along length 46.

Compensator 8 has a body 49. First end 42 of compensator 8 has a first shoulder 50 and a first arm 52. Second end 44 has a second shoulder 54 and a second arm 56. First shoulder 50 partitions body 49 from first arm 52. First arm 52 is of a lesser overall dimension than body 49. Second shoulder 54 partitions body 49 from second arm 56. Second arm 56 is of a lesser overall 20 dimension than body 49. Body 49 is preferred to be generally uniform in shape.

Compensator 8 is disposed between first leg 12 and second leg 14 of holder 4. Compensator 8 is disposed within second portion 20 of holder 4. First end 34 of compensator 8 is disposed adjacent to second end 32 of first leg 12. Second end 36 of compensator 8 is disposed adjacent to second end 36 of second leg 14.

Layer 10 is disposed between compensator 8 and holder 4.

Layer 10 is disposed between first end 42 of compensator 8 and first leg 12 of holder 4, and prefeably disposed between first arm 52 of first end 42 of compensator 8 and first leg 12 of holder 4.

Layer 10 is also disposed between compensator 8 and second leg 14 of holder 4, and preferably disposed between second arm 56 of second end 44 of compensator 8 and second leg 14 of holder 4.

Layer 10 affixes compensator 8 to holder 4. Layer 10 is an adhesive layer. Preferably, layer 10 is an epoxy. Layer 10 has a bonding strength sufficient enough to keep compensator 8 affixed to holder 4. Layer 10 is flexible. Layer 10 is flexible enough to allow an angular deformation of layer 10. The angular deformation is mathematically predictable.

Layer 10 may also be a soft metal soldering, ceramic adhesive or the like, so long as it has a bonding strength sufficient enough to keep compensator 8 affixed to holder 4 and is flexible enough to allow angular deformation in layer 10. Layer 10 may be made of a high temperature epoxy such as the brand name EPO-TEK 353ND, manufactured by Epoxy Technology Inc., located in Billerica, Mass., U.S.A. Connecting members 38 may be made of the same material.

Layer 10 has a top portion 58 and a bottom portion 60, separated by a center axis 62, as is seen in FIGS. 3a and 3b.

Although FIG. 1 is shown with layer 10 disposed at both, first end 42 and second end 44 of compensator 8, one of the layers may be eliminated without destroying the operation of the present invention. If a layer is eliminated, compensator 8 would be directly affixed to holder 4 at the respective end 42 or 44 where the layer is eliminated.

The thermal expansion coefficient, $\alpha_c$, of compensator 8, must be, at least, greater than the thermal expansion coefficient, $\alpha_h$, of holder 4, so that compensator 8 expands at a greater rate than holder 4 when there is an increase in ambient temperature. The relative difference between the respective thermal expansion coefficients will influence the actual physical size of device 2. It is understood that many embodiments of the present invention may be realized, resulting in various sizes of the physical device. If the difference between the respective thermal expansion coefficients is relatively minimal, then a larger device will be required to make adequate compensations. If the difference is relatively substantial, then only a relatively small device will be required to make adequate compensations. The sensitivity of grating 26 to strain and temperature also influences the difference between the materials used for holder 4 and compensator 8 and their respective thermal expansion coefficients. For commonly used fibers and metal materials in industries, a reasonable design can be accomplished with the thermal expansion coefficient difference around $1.0 \times 10^{-5}$/C between the two different materials of holder 4 and compensator 8.

The materials of holder 4 and compensator 8 may be any metal, such as aluminum or the like, a metal composite, or any other material such as plastic or the like. However, it is understood that certain plastics degrade over time and thus may not be suitable for applications requiring device 2 to survive a significant amount of time.

When there is an increase in ambient temperature, compensator 8 will expand at a greater rate than holder 4. Because compensator 8 is disposed within first and second legs 12 and 14 of holder 4, compensator 8 will exert a distributed force or pressure against layer 10 and through to holder 4. The distributed force is identified as 65 in FIGS. 3A and 3B. Distributed force 65 may be represented as a resultant force 64, (F). Force 64, located at a length, or an applied distance 66, (shown in FIGS. 3A, 3B and 4) from axis 17 of bar member 16, will cause angular displacement 78 of leg 12 of holder 4, as shown in FIG. 4, thereby reducing the pre-applied axial strain subjected to optical fiber 6. This reduction in axial strain will vary the center wavelength of grating 26 to compensate for the variations in the center wavelength introduced by the increase in ambient temperature.

With the increase in temperature, distance 66 will decrease to a new distance 67, (FIGS. 3A and 3B). Distance 66 will continue to decrease as the temperature increases. If the ambient temperature begins to decrease, distance 66 will begin to increase from distance 67. Because distance 66 is dependent on temperature, device 2 provides nonlinear compensation. This will be set forth more fully below.

With a given temperature increment, dT, the thermal deformation of compensator 6 and holder 4 along their respective axes 48 and 17, are, respectively:

$$dx_h = \alpha_h \cdot l_h \cdot dT$$

$$dx_c = \alpha_c \cdot l_c \cdot dT$$

where $\alpha_h$ and $\alpha_c$ are the thermal expansion, or extension, coefficients and $l_h$ and $l_c$ are the lengths of holder 4 and compensator 8, respectively. The difference in the linear deformation of the two components causes internal force 64, F, between them. The resultant displacements of the two components at a connecting point 68 along their axes 17 and 48, are:

$$\delta_{x_h}^a = dx_h + F \cdot C_{x_h}^a$$

$$\delta_{x_c}^a = dx_c - F \cdot C_{x_c}^a$$

where $C_{x_h}^a$ and $C_{x_c}^a$ are the compliances of holder 4 and compensator 8 along their respective axes 17 and 48 at connecting point 68 considered. Expression of force 64 is determined by letting $\delta_{x_h}^a = \delta_{x_c}^a$:

$$F = \frac{dx_c - dx_h}{C^a_{x_h} + C^a_{x_c}}$$

FIG. 4 shows the deformation of holder 4 subjecting to the temperature increment, dT and the so induced force 64, F. The center line 70 of first leg 12 of holder 4 moves from an original position 72 to a new position 74, where $$\delta_{x_h}^{\,0} = dx_h + F \cdot C_{x_h}^{\,0} \qquad (9)$$

is the displacement 76 of bar member 16 along axis 17;

$$\theta_h = \frac{\delta_{x_h}^a - \delta_{x_h}^0}{D_c} \qquad (10)$$

is the angular deformation 78 of first leg 12; and, $$\delta_{xh}^b = \delta_{xh}^0 - \theta h \cdot Df = \delta_{xh}^0 - \frac{Df}{Dc}(\delta_{xh}^a - \delta_{xh}^0) \qquad (11)$$

is the displacement 80 of first end 30 of first leg 12, where grating 26 is mounted.

In equations (9), (10) and (11), above:

$C_{x_h}^{\,0}$ is the compliance of bar member 16 of holder 4 along axis 17;

$D_c$ is distance 66 from the application line of force 64 to axis 17; and, $D_f$ is a distance 82 from grating 26 to axis 17.

The strain in grating 26 due to displacement $\delta_{x_h}^b$, namely:

$$\varepsilon_g = \frac{\delta_{x_h}^b}{l_h} = \frac{\left\{\delta_{x_h}^0 - \frac{D_f}{D_c}(\delta_{x_h}^a - \delta_{x_h}^0)\right\}}{l_h}$$

is used to compensate for the shifting center wavelength due to the increment of the temperature.

As an integration of the stress along layer 10, force 64 changes it application position, or applied distance 66, when the stress distribution varies. The stress distribution in layer 10 varies with angular deformation 78 of first leg 12, which is a function of temperature increment. Thus distance 66, $D_c$, is a function of temperature increment, dT, as well as displacements $\delta_{x_h}^a$ and $\delta_{x_h}^0$. Thus the Strain ε, which is used to compensate the center wavelength shifting due to temperature variation, is a nonlinear function of the temperature increment. With proper choice of the design parameters, the relationship between the stain and temperature increment can be controlled so that both linear and nonlinear components of the center wavelength-temperature sensitivity of the gratings are compensated.

FIG. 5 shows a temperature/center-wavelength curve 84 of a grating with the nonlinear compensation device and method of the present invention, and a curve 86 of a grating with a common compensation device and methods as disclosed by G. W. Yoffe, et al., in "Passive Temperature-Compensating Package for Optical Fiber Gratings", *Applied Optics*, Vol. 34, No.30, pp. 6859–6861, October, 1995. As is readily apparent, the present invention provides more effective compensation generating a more stable central wavelength over a broad temperature range, than prior common devices.

The foregoing description of layer 10, first leg 12 of holder 4 and first end 42 of compensator 8 is also applicable to the other layer 10, second leg 14 of holder 4 and second end 44 of compensator 8.

It is understood that device 2 may be fixed, or immovably, at one end. In other words, first leg 12 or second leg 14 may be immovable allowing the deformation owing to temperature changes to occur at the opposite end or leg.

It is understood that device 2 may be operably configured to compensate more than one fiber optic grating simultaneously. Multiple gratings may be arranged on device 2 in a parallel relationship.

Figure 6:
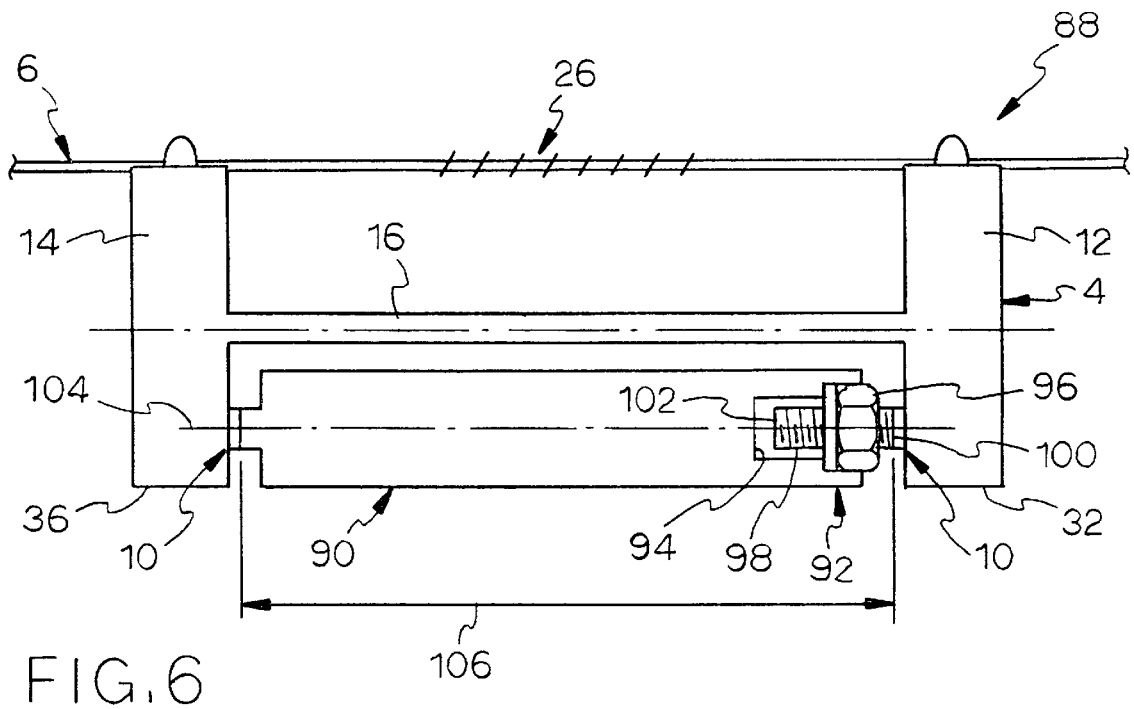
FIG. 6 is a schematic view of an alternative embodiment of a fiber optic grating temperature compensation device made in accordance with the present invention.

It is advantageous to be able to adjust the center wavelength of grating 26 after assembly of device 2. This is identified as post tuning of the center wavelength. This post tuning may be accomplished by precisely adjusting the physical dimensions of compensator 8 after the mounting of the optical fiber 6 with embedded grating 26. FIG. 6 shows a device 88, which is an alternative embodiment of the present invention, that provides post tuning of the central wavelength of a fiber optic grating.

Device 88 is similar to device 2, disclosed above, except that device 88 includes an alternate compensator 90. Compensator 90 is similar to and has all of the components and attributes of compensator 8, disclosed above, except that compensator 90 has a modified first end 92. Modified first end 92 includes a recess 94, a threaded receiving region 96, and a threaded shaft 98.

Threaded receiving region 96 is disposed adjacent recess 94 of first end 92. Region 96 may be a nut affixed to first end 92.

Threaded shaft 98 has a first end 100 and a second end 102. Threaded shaft 98 is operably adapted to mate with threaded receiving region 96. Threaded shaft 98 is disposed about a central axis 104 of compensator 88. Second end 102 of threaded shaft 98 is disposed within recess 94. First end 100 of threaded shaft 98 is disposed adjacent second end 32 of first leg 12. Layer 10 attaches first end 100 of threaded shaft 98 to second end 32 of first leg.

Compensator 88 has a length 106. Length 106 can be adjusted to increase or decrease length 106, by rotating threaded shaft 98 in relation to threaded receiving region 96. With a change of length 106 of compensator 88, angular deformation 78, not shown in FIG. 6, of first leg 12 of holder 4 varies, as well as the strain subject to grating 26. Accordingly once device 88 is assembled, a user may use equipment, known in the art, to analyze the device to determine the center wavelength of grating 26. The center wavelength of grating 26 may then selectively be adjusted to a desired setting by rotating threaded shaft 98 in relation threaded receiving region 96 to modify the dimension of length 106 of compensator 88.

Figure 7:
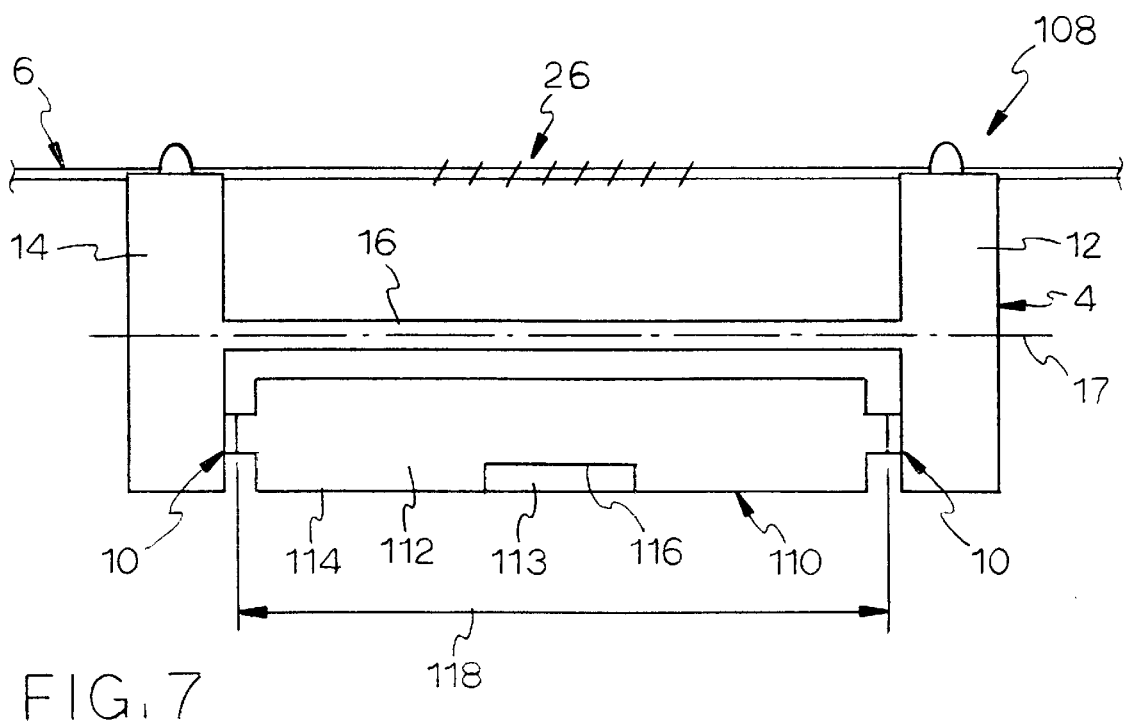
FIG. 7 is a schematic view of yet another alternative embodiment of a fiber optic grating temperature compensation device made in accordance with the present invention; and, FIG. 8 is a plot of two a temperature/center-wavelength curve for a optic fiber grating temperature compensation device made in accordance with the present invention with and without post tuning of the compensation.

It is also advantageous to be able to adjust the level that device 2 compensates for the variances in the center wavelength of grating 26 due to temperature changes. This is called post tuning of the compensation. This compensation post tuning may be accomplished by modifying the thermal expansion coefficients of holder 4 or compensator 8, after device 2 is assembled and tested. FIG.7 shows a device 108, which is an alternative embodiment of the present invention, that provides post tuning of the level of compensation of device 108 for the variance in the central wavelength of light traveling through grating 26 that are due to temperature variations.

Device 108 is similar to device 2 or alternate device 88, disclosed above, except that device 108 includes a second alternate compensator 110 and an insert member 113.

Compensator 110 is similar to and has all of the components and attributes of compensator 8 or alternate compensator 90 of alternate device 88, disclosed above, except that compensator 110 has a modified main body 112.

Modified main body 112 includes an outer surface 114 and a receiving cavity 116. Receiving cavity 116 is disposed on outer surface 114. Receiving cavity 116 may disposed at any location along a length 118 of compensator 110. Receiving cavity is preferred to be disposed at a midpoint of length 118.

Insert member 113 is disposed adjacent to compensator 110. Insert member 113 is preferred to be operably associated with receiving cavity 116. Insert member 113 is further preferred to be attached to compensator 110 within receiving cavity 116.

Insert member 113 has a thermal expansion, or extension, coefficient. The thermal expansion coefficient of insert member is different than the thermal expansion coefficient of compensator 110. With insert member 113 attached to main body 112 of compensator 110, the overall thermal expansion coefficient of compensator 110, will be changed to reflect the addition of the thermal expansion coefficient of insert member 113.

Insert member 113 may be made of any material, so long as the thermal expansion coefficient of insert member 113 is different from the thermal expansion coefficient of compensator 110. The choice of the material of insert member 113 depends on how much a user desires to change the overall thermal expansion coefficient of compensator 110 based on testing results of grating 26.

The overall thermal expansion coefficient of compensator 110 with insert member 113 attached thereto, will effect the rate that compensator 110 expands in relation to holder 4 when there is an ambient temperature change. This change in comparative expansion rates will necessarily will alter the amount of force 64 that first leg 112 will be subject to from compensator 110. Accordingly, the amount of change in axial strain exerted upon fiber grating 26 will also be affected. Thus device 108 provides for the post tuning of the level of compensation.

Figure 8:
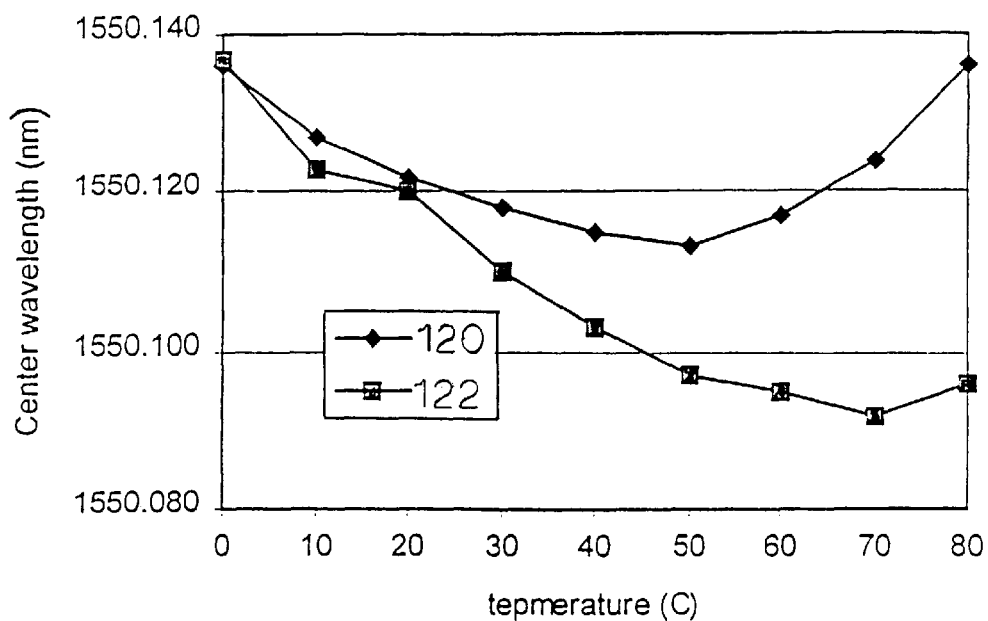

FIG. 8 shows a curve 120 of a grating and a curve 122 of the same grating after post tuning of the compensation. The parameters underlying the creation of FIGS. 5 and 8 are as follows. WDM gratings made by Bragg Photonics Inc. were used and an optical spectrum analyzer was used to measure the wavelengths. A thermal oven made by Thermtron Inc. was used for temperature control. The test conditions included a temperature interval of 10 C. and a stabilization time of 10 minutes.

It is also understood that the thermal properties of holder 4 may be modified to post tune the compensation of device 2.

While this invention has been described as having a preferred design and method, it is understood that it is capable of further modification, uses and/or adaption following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A fiber optic temperature compensating device comprising:
a) a holder having a first thermal expansion coefficient, a first leg, a second leg and a bar member, said bar member connecting said first leg and said second leg and said bar member defining a first portion and a second portion of the device, said holder being operably configured for holding a fiber grating between said first leg and said second leg in said first portion, whereby the optical fiber grating is operably adapted for passage of a light there through and for reflecting the light within a range about a center wavelength that varies with changes in ambient temperature and with changes in an axial strain subjected to the optical fiber grating;
b) a compensator having a second thermal expansion coefficient and an end, said compensator is disposed between said first leg and said second leg in said second portion, said second thermal expansion coefficient is greater than said first thermal expansion coefficient so that an increase in ambient temperature of the device causes said compensator to expand at a greater rate than said holder and said compensator applies to said holder a force, located at an applied distance from said bar member, whereby said axial strain of the optical fiber grating is reduced to vary the center wavelength of the grating, providing a compensation for variations in said center wavelength introduced by the increase in ambient temperature; and,
c) a layer disposed between said end of said compensator and said first leg of said holder, said layer is flexible so that an increase in ambient temperature will vary said applied distance of said force, making said compensation a nonlinear function of said temperature, whereby an increase in temperature imparts a decrease in said applied distance.

2. A device, as recited in claim 1, wherein:
a) said second thermal expansion coefficient is greater than said first thermal expansion coefficient by $1.0 \times 10^{-5}$/C.

3. A device, as recited in claim 1, wherein:
a) said layer is an epoxy.

4. A device, as recited in claim 1, wherein:
a) said layer is metal soldering.

5. A device, as recited in claim 1, wherein:
a) said layer is a ceramic adhesive.

6. A device, as recited in claim 1, wherein:
a) said layer is a high temperature epoxy.

7. A device, as recited in claim 1, wherein:
a) said layer affixes said compensator to said holder.

8. A device, as recited in claim 1, further comprising:
a) a second layer;
b) said compensator further includes a second end;
c) a second force located at a second applied distance from said bar member and created by said compensator expanding at a greater rate than said holder with an increase in ambient temperature, whereby said axial strain of the optical fiber grating is reduced when said force is increased due to an increase in temperature;
d) said second layer is disposed between said second end of said compensator and said second leg of said holder; and,
e) said second layer is flexible so that an increase in ambient temperature will vary said second applied distance of said second force, whereby an increase in ambient temperature imparts a decrease in said second applied distance.

9. A device, as recited in claim 1, further comprising:
a) means for post tuning the center wavelength of the optical fiber grating.

10. A device, as recited in claim 1, wherein:
a) said end of said compensator has a recess, a threaded region and a threaded shaft;
b) said threaded region is disposed adjacent said recess and is rotatable;
c) said threaded shaft has a first end and a second end;
d) said threaded shaft operably engages said threaded region;
e) said layer is disposed between said first end of said threaded shaft and said first leg of said compensator;
f) said second end of said threaded shaft is disposed within said recess; and,
g) said compensator has a varying length, whereby selective rotation of said threaded region in relation to said threaded shaft will vary said varying length of said compensator and correspondingly vary the center wavelength.

11. A device, as recited in claim 1, further comprising:
a) means for post tuning an amount the device compensates the center wavelength of the optical fiber grating.

12. A device, as recited in claim 1, further comprising:
a) an insert member having a third thermal expansion coefficient, said third thermal expansion coefficient is different in value than said second thermal expansion coefficient of said compensator;
b) said compensator has a receiving cavity; and,
c) said insert member is operably adapted to engage said receiving cavity of said compensator, said insert member modifying a rate said compensator expands with an increase in temperature, said compensation provided to the optical fiber grating by the device is altered.

13. A device as recited in claim 12, further comprising:
a) a second insert member having a fourth thermal expansion coefficient, said fourth thermal expansion coefficient is different in value than said second thermal expansion coefficient of said compensator;
b) said compensator has a second receiving cavity; and,
c) said second insert member is operably adapted to engage said second receiving cavity of said compensator, said second insert member modifying a rate said compensator expands with an increase in temperature, whereby said compensation provided to the optical fiber grating by the device is altered.

14. A device, as recited in claim 1, further comprising:
a) a connecting member operably adapted to secure the optical fiber grating to said holder.

15. A device, as recited in claim 14, further comprising:
a) a second connecting member operably adapted to secure the optical fiber grating to said second leg of said holder.

16. A device, as recited in claim 1, wherein:
a) the device includes a central axis; and,
b) said bar member is disposed along said center axis.

17. A method of compensating for changes of a center wavelength of a fiber optic grating due to temperature variations comprising:
a) providing a holder having a first thermal expansion coefficient, a first leg, a second leg and a bar member, said bar member connecting said first leg and said second leg and said bar member defining a first portion and a second portion of the device;
b) applying an pre-load axial strain to the fiber optic grating;
c) attaching the fiber optic grating with said pre-load axial strain to said first leg and said second leg in said first portion, whereby the optical fiber grating is operably adapted for passage of a light therethrough and for reflecting the light within a range about a center wavelength that varies with changes in temperature and with changes in an axial strain subjected to the optical fiber grating;
d) providing a compensator having an end and a second thermal expansion coefficient that is greater in value than said first thermal expansion coefficient;
e) disposing said compensator between said first leg and said second leg in said second portion, whereby an increase in temperature of the device causes said compensator to expand at a greater rate than said holder and said compensator applies to said holder a force, located at an applied distance from said bar member, whereby said axial strain of the optical fiber grating is reduced to vary the central wavelength of the grating, providing a compensation for variations in the center wavelength introduced by the increase in temperature;
f) providing a layer that is flexible; and,
g) disposing said layer between said end of said compensator and said first leg of said holder, so that an increase in temperature will vary said applied distance of said force making said compensation a nonlinear function of said temperature, whereby an increase in temperature imparts a decrease in said applied distance.

18. A method, as recited in claim 17, further comprising:
a) post-tuning of the center wavelength of the fiber optic grating.

19. A method, as recited in claim 18, wherein said post-tuning step comprising:
a) providing a nut having internal threads and rotatably mounted to said end of said compensator;
b) providing a threaded shaft having a first end and being operably adapted to mate with said nut;
c) disposing said layer between said first end of said threaded shaft and said first leg of said compensator; and,
d) rotating said nut in relation to said threaded shaft to vary an overall length of said compensator, whereby the center wavelength of the fiber optic grating is correspondingly changed.

20. A method, as recited in claim 17, further comprising:
a) post-tuning of said compensation.

21. A method, as recited in claim 20, wherein said post-tuning of said compensation step comprising:
a) providing an insert member having a third thermal expansion coefficient, said third thermal expansion coefficient is different in value than said second thermal expansion coefficient of said compensator;
b) said providing a compensator step further includes providing a compensator having a receiving cavity, operably adapted to receive said insert member; and,
c) engaging said insert member with said receiving cavity of said compensator to modify a rate said compensator expands with an increase in temperature, whereby said compensation is correspondingly changed.

22. A method as recited in claim 17, wherein:
a) said layer of said providing a layer step is an epoxy.

23. A device for compensating for changes in a center wavelength of a fiber optic grating due to temperature variations, comprising:
a) a holder having a first leg, a second leg and a bar member connecting said first and second legs, said holder for securing the fiber optic grating to said first and second legs;
b) a compensator attached to said first and second legs of said holder;
c) a layer disposed between said compensator to said first leg of said holder;
d) said bar member disposed between said compensator and said grating; and,
e) said holder and said compensator have a first and a second thermal expansion coefficient respectively, said second thermal expansion coefficient of said compensator is greater in value than said first thermal expansion coefficient of said holder.

24. A device, as recited in claim 23, wherein:
a) said layer is an epoxy.

* * * * *